(12) United States Patent
Tsadok et al.

(10) Patent No.: US 9,342,341 B2
(45) Date of Patent: May 17, 2016

(54) SYSTEMS AND METHODS FOR DEPLOYING AN APPLICATION AND AN AGENT ON A CUSTOMER SERVER IN A SELECTED NETWORK

(71) Applicant: Alcatel-Lucent, Paris (FR)

(72) Inventors: Shlomi Tsadok, Netanya (IL); Ittay Dror, Rishon Lezion (IL)

(73) Assignee: Alcatel Lucent, Boulogne-Billancourt (FR)

( * ) Notice: Subject to any disclaimer, the term of this patent is extended or adjusted under 35 U.S.C. 154(b) by 276 days.

(21) Appl. No.: 13/826,322

(22) Filed: Mar. 14, 2013

(65) Prior Publication Data

US 2014/0282505 A1    Sep. 18, 2014

(51) Int. Cl.
*G06F 9/455* (2006.01)

(52) U.S. Cl.
CPC .. *G06F 9/45558* (2013.01); *G06F 2009/45562* (2013.01)

(58) Field of Classification Search
None
See application file for complete search history.

(56) References Cited

U.S. PATENT DOCUMENTS

| 7,797,466 | B2 | 9/2010 | Moriki et al. |
| 7,890,669 | B2 | 2/2011 | Uehara et al. |
| 8,376,219 | B1 | 2/2013 | Kropf et al. |
| 2004/0049524 | A1* | 3/2004 | Toyota et al. ............... 707/203 |
| 2008/0163207 | A1* | 7/2008 | Reumann et al. ............ 718/1 |
| 2008/0184225 | A1* | 7/2008 | Fitzgerald et al. .......... 718/1 |
| 2010/0169467 | A1* | 7/2010 | Shukla et al. ............... 709/220 |
| 2011/0022695 | A1* | 1/2011 | Dalal et al. ................. 709/222 |
| 2011/0231899 | A1* | 9/2011 | Pulier et al. ................. 726/1 |
| 2012/0016977 | A1* | 1/2012 | Robertson et al. .......... 709/224 |
| 2012/0110328 | A1* | 5/2012 | Pate et al. ................... 713/165 |
| 2012/0173757 | A1* | 7/2012 | Sanden ....................... 709/238 |
| 2012/0185913 | A1* | 7/2012 | Martinez et al. ............ 726/1 |
| 2012/0233611 | A1* | 9/2012 | Voccio ........................ 718/1 |

\* cited by examiner

*Primary Examiner* — Dong Kim

(74) *Attorney, Agent, or Firm* — Chiesa Shahinian & Giantomasi, PC

(57) ABSTRACT

Information indicating a location of a disk image of a virtual machine hosted on a server is received. The virtual machine is deactivated. The server is instructed to mount the disk image. A static route pointing to a selected network is added to a static routing table on a file system associated with the virtual machine. The server is instructed to dismount the disk image. The virtual machine is activated.

19 Claims, 4 Drawing Sheets

SYSTEMS AND METHODS FOR DEPLOYING AN APPLICATION AND AN AGENT ON A CUSTOMER SERVER IN A SELECTED NETWORK

TECHNICAL FIELD

This specification relates generally to systems and methods for deploying network-based services in a network, and more particularly, to systems and methods for deploying an application and an agent on a customer server in a selected network.

BACKGROUND

Deployment of network-based services on a customer server in a multi-tiered network environment (i.e., a set of networks associated with different security zones) must typically be performed manually. Existing systems and methods do not permit automatic deployment of a network-based service in a multi-tiered network environment. Provisioning of services is often managed by an entity located within a network having a relatively high security level. However, if deployment of a service to a customer network having a lower security level is required, two-way communication between the higher level network and the customer network is restricted, causing deployment by an entity in the higher level network to be difficult or impossible.

SUMMARY

In accordance with an embodiment, a method of deploying services in a selected network is provided. Information indicating a location of a disk image of a virtual machine hosted on a server is received. The virtual machine is deactivated. The server is instructed to mount the disk image. A static route pointing to a selected network is added to a static routing table on a file system associated with the virtual machine. The server is instructed to dismount the disk image. The virtual machine is activated.

In one embodiment, a second server creates the virtual machine on the server. A third server receives, from the second server, information indicating a location of a disk image of the virtual machine.

In another embodiment, an application and an agent on a fourth server associated with a customer network are deployed by the virtual machine.

In one embodiment, the application comprises a web server. The agent monitors a selected function of the fourth server.

In another embodiment, the virtual machine is linked to a first network associated with a first security zone, and the customer network is associated with a second security zone different from the first security zone. Communications between the customer network and the first network are restricted.

These and other advantages of the present disclosure will be apparent to those of ordinary skill in the art by reference to the following Detailed Description and the accompanying drawings.

DETAILED DESCRIPTION

Existing systems and methods do not permit automatic deployment of a network-based service in a multi-tiered network environment. It is often desirable that deployment of services be performed by an entity located within a network having a relatively high security level. However, if deployment of a service to a customer network having a lower security level is required, two-way communication between the higher level network and the customer network is restricted, causing the deployment to be difficult or impossible.

Accordingly, there is a need for improved systems and methods for deploying network-based services in a multi-tiered network environment. In particular, there is a need for systems and methods for deploying network-based services automatically in a multi-tiered network environment.

Figure 1:
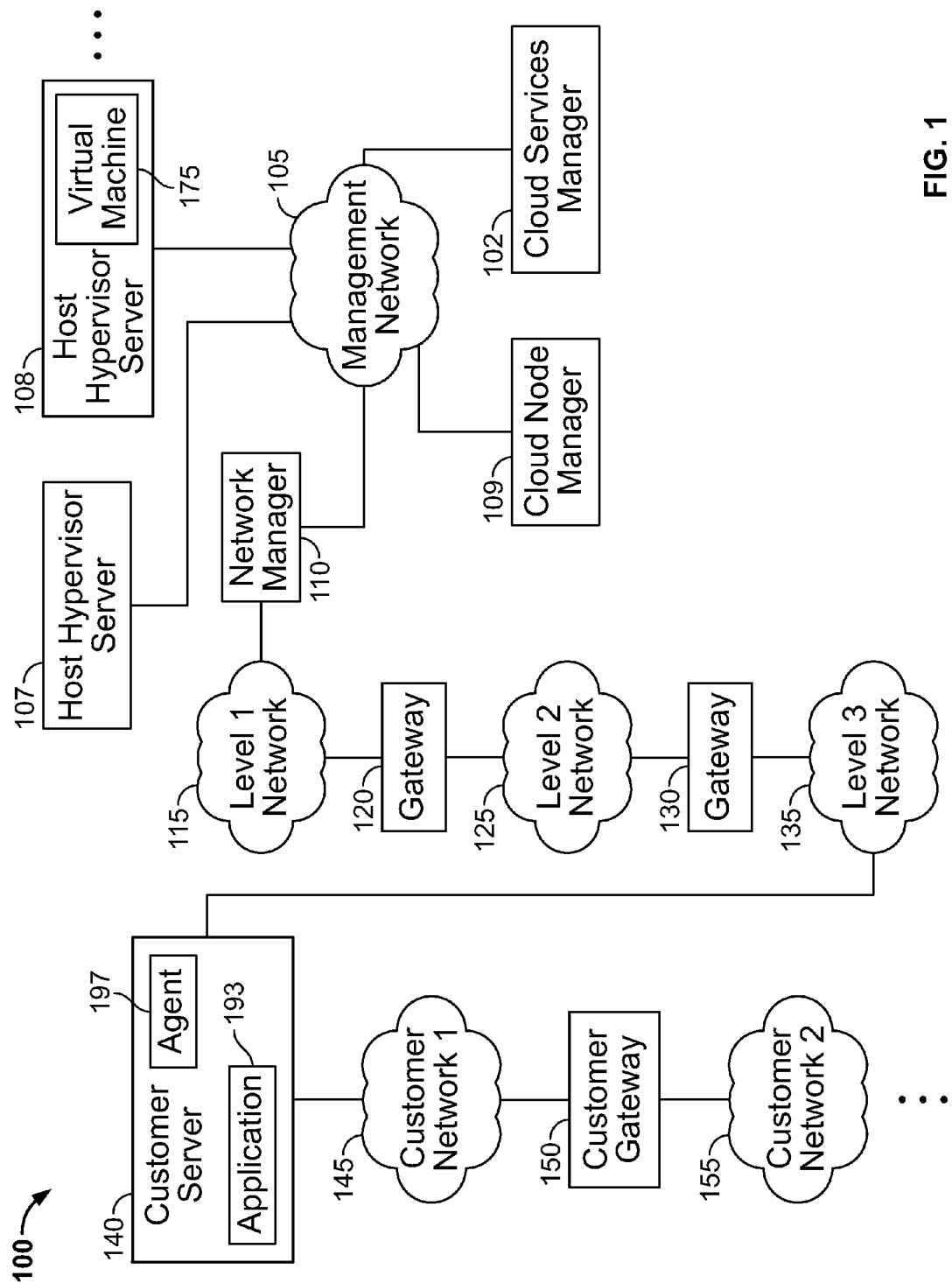
FIG. 1 shows a communication system in accordance with an embodiment.

FIG. 1 shows a communication system that may be used to offer network-based services to users. Communication system 15 comprises a management network 105, a Level 1 network 115 associated with a first security zone, a Level 2 network 125 associated with a second security zone, and a Level 3 network 135 associated with a third security zone.

Communications system 100 also includes a customer network 145 and a customer network 155. A customer gateway 150 is linked to customer network 145 and customer network 155. A customer server 140 is linked to Level 3 network 135 and to customer network 145. Customer server 140 provides a platform for providing network-based services to users of customer network 145. While only one customer server is shown in FIG. 1, in other embodiments, a plurality of customer servers may be used.

Each network 105, 115, 125, 135, 145, 155 may comprise one or more of a number of different types of networks, such as, for example, an intranet, a Fibre Channel-based storage area network (SAN), an iSCSI-based network, a local area network (LAN), a wide area network (WAN), or a wireless network. One or more of the networks shown may be the Internet. Other networks may be used.

A cloud services manager 102, a cloud node manager 109, and a plurality of host hypervisor servers 107, 108 are linked to management network 105. Cloud services manager 102 manages the deployment and provision of network-based services in networks 115, 125, 135, 145, and 155. For example, cloud services manager 102 may cause an application to be deployed on customer server 140, and subsequently monitor the provision of services by customer server 140 in accordance with policies established by an administrator.

Each hypervisor server 107, 108 is linked to management network 105. While only two hypervisor servers 107, 108 are shown in FIG. 1, any number of hypervisor servers may be linked to management network 105.

While in FIG. 1, hypervisor servers 107, 108 and customer server 140 are shown separately, other arrangements are possible. For example, in one embodiment, customer server 140 is deployed on a selected host hypervisor server 107, 108.

Each hypervisor server 107, 108 may host one or more virtual machines. A virtual machine may be a software application that emulates a server, for example. For example, a virtual machine may run an application and/or an agent, for example.

Cloud node manager 109 may from time to time generate a virtual machine on a selected hypervisor server. In one embodiment in which a plurality of hypervisor servers are linked to management network 105, cloud node manager 109 may generate a virtual machine in response to an instruction from cloud services manager 102, and place the virtual machine on a selected hypervisor server. Cloud node manager 109 may select a hypervisor server in accordance with one or more policies relating to load balancing, for example.

A network manager 110 is linked to management network 105 and Level 1 network 115. Network manager 110 may facilitate deployment of an application, such as a web server, on a selected customer server. Network manager 110 may also facilitate deployment of an agent on the customer server to monitor the performance of the customer server and/or the application, the provision of services by the application, etc.

In many environments, it is desirable to establish multiple security zones and control access to the zones according to one or more access control lists (ACLs). In the illustrative embodiment, Level 1 network 115 is associated with a highest level of security, Level 2 network 125 is associated with a medium level of security, and Level 3 network 135 is associated with a lowest level of security. A plurality of gateways are used to control access to the various networks. Specifically, a gateway 120, which may comprise a firewall, for example, links Level 1 network 115 and Level 2 network 125, and a gateway 130, which may comprise a firewall, links Level 2 network 125 and Level 3 network 135. Gateways 120 and 130 may control communications based on access control lists, for example, to enable only authorized entities to access higher level security zones. Entities having lower level access may be denied access to higher level security zones. For example, customer server 140 may be denied access to Level 1 network 115.

Such conditions can present a challenge to certain network management functions. For example, supposing that an administrator wishes to use cloud services manager 102 to deploy an application on customer server 140, it may be difficult or impossible to do so due to the inability of customer server 140 to communicate with cloud services manager 102. Specifically, in some examples, no network route exists between customer server 140 and cloud services manager 102; therefore no communication is possible between customer server 140 and cloud services manager 102.

Accordingly, there is a need for improved systems and methods to deploy services among devices in different networks associated with different security zones.

Figure 2A:
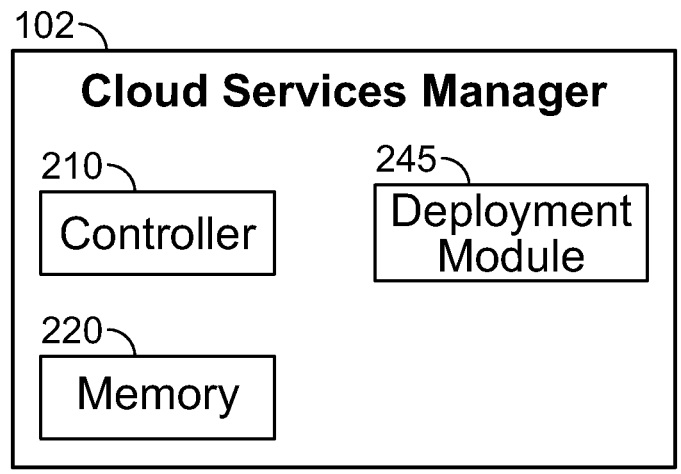
FIG. 2A shows components of a cloud services manager in accordance with an embodiment.

FIG. 2A shows components of cloud services manager 102 in accordance with an embodiment. Cloud services manager 102 comprises a controller 210, a memory 220, and a deployment module 245. Controller 210 orchestrates operations of other components of cloud services manager 102. Memory 220 stores data. Various components of cloud services manager 102 may from time to time store data in memory 220. Deployment module 245 provides functionality for managing the deployment of services in various networks. Cloud services manager 102 may comprise components not shown in FIG. 2A.

Figure 2B:
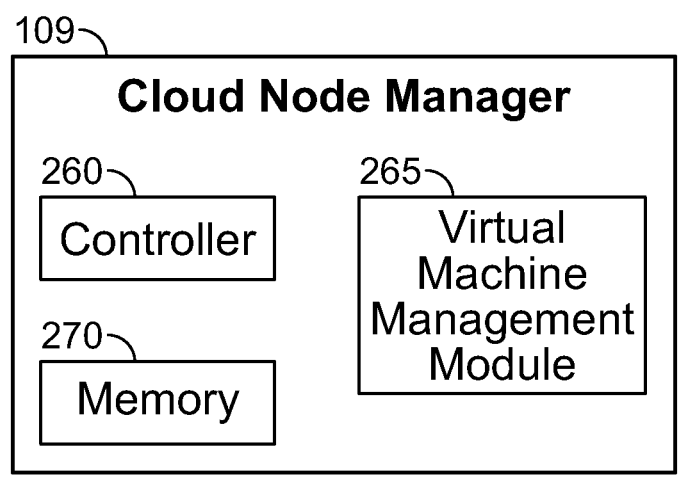
FIG. 2B shows components of a cloud node manager in accordance with an embodiment.

FIG. 2B shows components of cloud node manager 109 in accordance with an embodiment. Cloud node manager 109 comprises a controller 260, a memory 270, and a virtual machine management module 265. Controller 260 orchestrates operations of other components of cloud node manager 109. Memory 270 stores data. Various components of cloud node manager 109 may from time to time store data in memory 270. Virtual machine management module 265 provides functionality for generating and managing a virtual machine in connection with the deployment of services in various networks. Cloud node manager 109 may comprise components not shown in FIG. 2B.

Figure 3A:
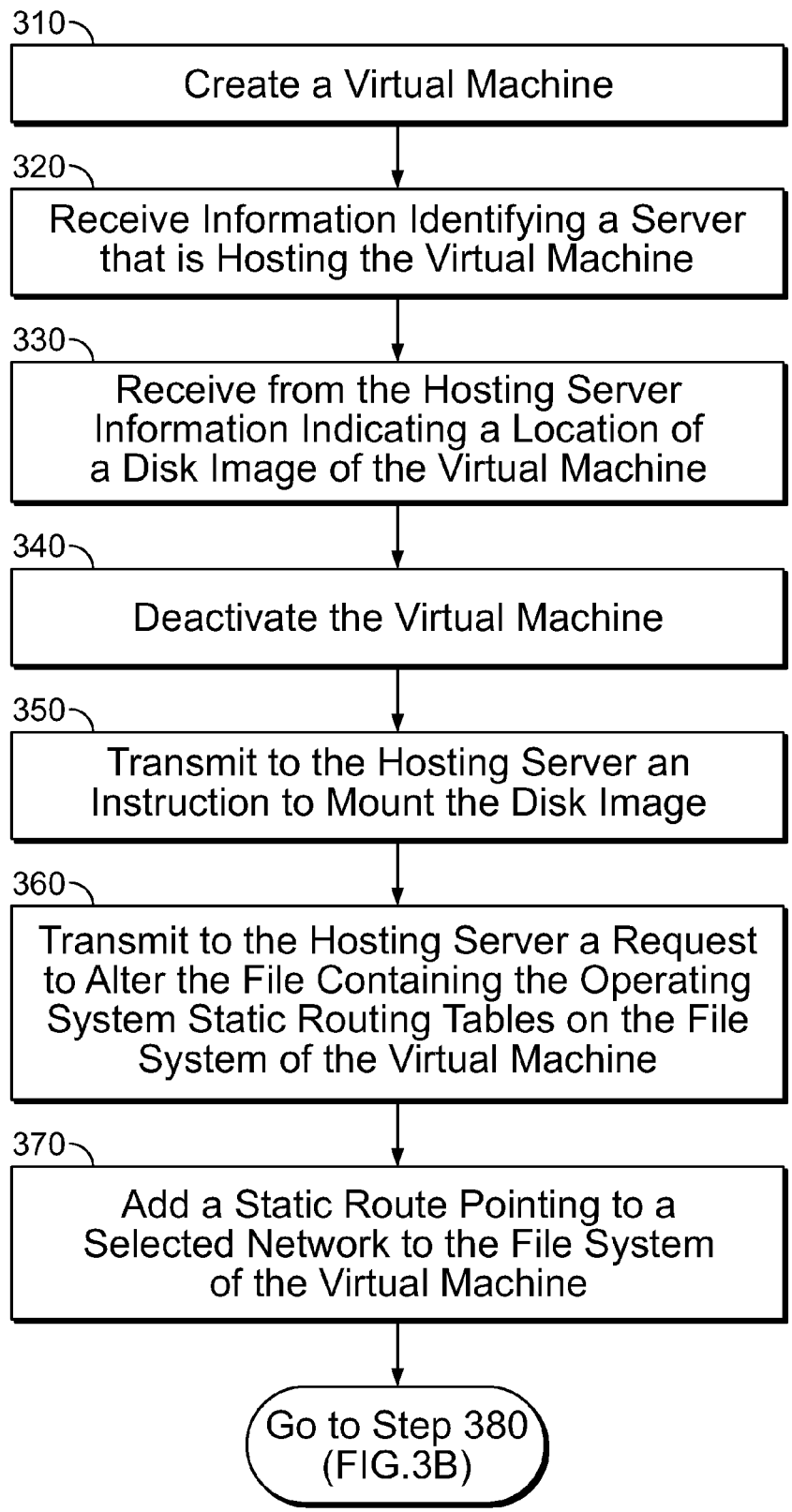
FIGS. 3A-3B show a flowchart of a method for deploying network-based services in accordance with an embodiment.
Figure 3B:
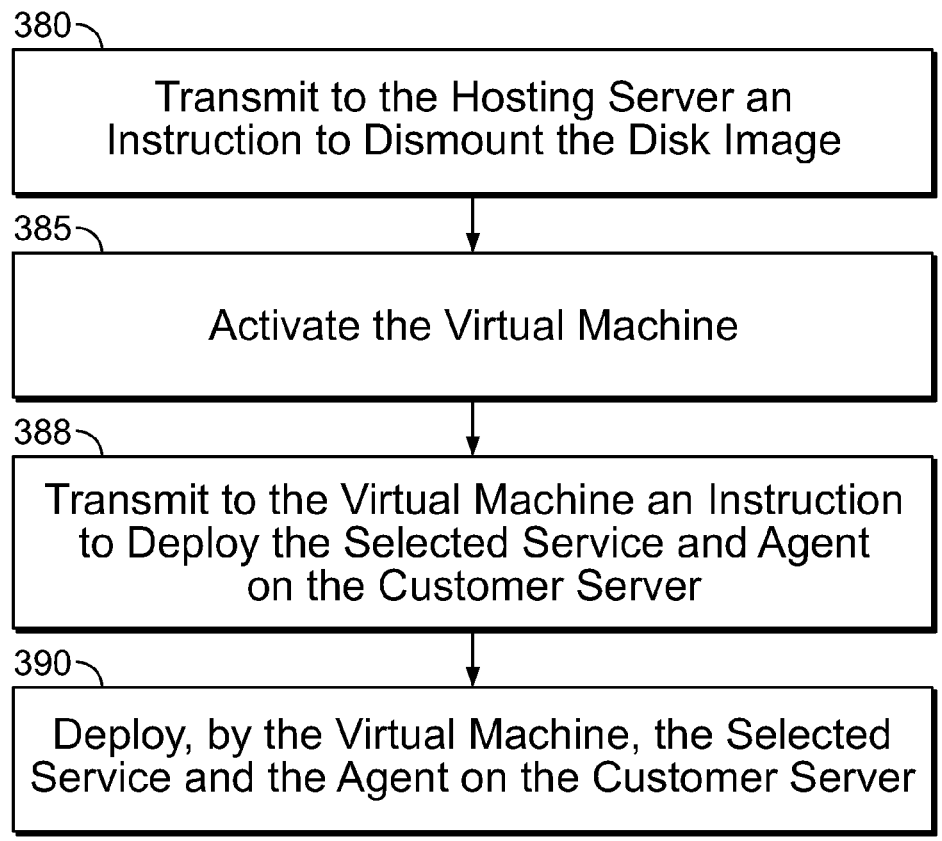

FIGS. 3A-3B show a flowchart of a method of deploying an application and an agent in a communication system having multiple networks and multiple security zones in accordance with an embodiment.

At step 310, a virtual machine is created. In the illustrative embodiment, cloud services manager 102 transmits to cloud node manager 109 a request to generate a virtual machine and install it on a selected hypervisor server. In response, cloud node manager 109 generates a virtual machine and places the virtual machine on a selected hypervisor server. Cloud node manager 109 may select a hypervisor server based on load balancing considerations, for example. In the illustrative embodiment, cloud node manager 109 generates a virtual machine and installs it on hypervisor server 108 as virtual machine 175, as shown in FIG. 1.

At step 320, information identifying a server that is hosting the virtual machine is received. Cloud services manager 102 requests from cloud node manager 109 information indicating the location of the virtual machine. In response, cloud node manager 109 informs cloud services manager 102 that virtual machine 175 is located on hypervisor server 108.

At step 330, information indicating a location of a disk image of the virtual machine is obtained from the hosting server. In the illustrative embodiment, the location of a disk image is represented by a disk image path. Accordingly, cloud services manager 102 instructs cloud node manager 109 to obtain the disk image path of virtual machine 175. In response, cloud node manager 109 requests from hypervisor server 108 the disk image path of virtual machine 175. In response, hypervisor server 108 provides to cloud node manager 109 the disk image path of virtual machine 175. Cloud node manager 109 provides the disk image path information to cloud services manager 102.

At step 340, the virtual machine is deactivated. Cloud services manager 102 instructs cloud node manager 109 to deactivate virtual machine 175. In response, cloud node manager 109 deactivates virtual machine 175.

At step 350, an instruction to mount the disk image is transmitted to the hosting server. Cloud node manager 109 transmits to hypervisor server 108 a request to mount the disk image of virtual machine 175. In response, hypervisor server 108 mounts the disk image.

At step 360, a request to alter the file containing the operating system static routing tables on the file system of the virtual machine is transmitted to the hosting server. Accordingly, cloud node manager 109 transmits to hypervisor server 108 a request to alter the file containing the operating system static routing tables on the file system of virtual machine 175. In response, hypervisor server 108 alters the file containing the operating system static routing tables on the file system of virtual machine 175. In other embodiments, cloud node manager 109 may transmit a request to effect another type of alteration to a relevant networking configuration to enable communication between customer server 140 and cloud services manager 102.

At step 370, a static route pointing to a selected network is added to the file system of the virtual machine. Cloud node manager 109 instructs hypervisor server 108 to add, to the file system of virtual machine 175, a static route pointing to Level 1 network (115). In response, hypervisor server 108 adds, to the file system of virtual machine 175, a static route pointing to Level 1 network (115). In other embodiments, hypervisor server 108 may effect other types of alterations to a relevant networking configuration in order to enable communication between customer server 140 and cloud services manager 102.

At step 380, an instruction to dismount the disk image is transmitted to the hosting server. Cloud node manager 109 transmits a request to hypervisor server 108 to dismount the disk image. In response, hypervisor server 108 dismounts the disk image.

At step 385, the virtual machine is activated. Cloud services manager 102 now instructs cloud node manager 109 to activate virtual machine 175. In response, cloud node manager 109 activates virtual machine 175.

After communication between customer server 140 and virtual machine 175 is enabled, cloud services manager 102 informs network manager 110 that virtual machine 175 is ready to be used. At step 388, an instruction to deploy the selected service and agent on the customer server is transmitted. Network manager 110 instructs virtual machine 175 to deploy the selected application and agent on customer server 140.

At step 390, the selected service and agent are deployed, by the virtual machine, on the customer server. Virtual machine 175 accordingly deploys the selected application (shown as application 193 in FIG. 1) on customer server 140. Application 193 may be any type of application. For example, application 193 may be a web server application, an email server application, etc.

Virtual machine 175 also deploys an agent (shown as agent 197 in FIG. 1) on customer server 140. Agent 197 may monitor a selected function of customer server 140. In the illustrative embodiment, agent 197 may also receive commands from cloud services manager 102 and respond accordingly. For example, agent 197 may receive a command to download and install a selected software application, to monitor and report on the disk usage of customer server 140, to monitor and report on CPU utilization of customer server 140, etc.

In various embodiments, the method steps described herein, including the method steps described in FIGS. 3A-3B, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 3A-3B, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 4:
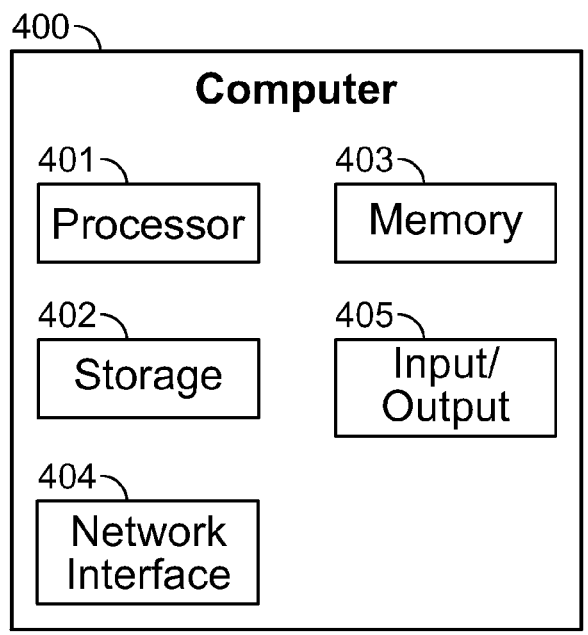
FIG. 4 shows an exemplary computer that may be used to implement certain embodiments of the invention.

A high-level block diagram of an exemplary computer that may be used to implement systems, apparatus and methods described herein is illustrated in FIG. 4. Computer 400 includes a processor 401 operatively coupled to a data storage device 402 and a memory 403. Processor 401 controls the overall operation of computer 400 by executing computer program instructions that define such operations. The computer program instructions may be stored in data storage device 402, or other computer readable medium, and loaded into memory 403 when execution of the computer program instructions is desired. Thus, the method steps of FIG. 4 can be defined by the computer program instructions stored in memory 403 and/or data storage device 402 and controlled by the processor 401 executing the computer program instructions. For example, the computer program instructions can be implemented as computer executable code programmed by one skilled in the art to perform an algorithm defined by the method steps of FIGS. 3A-3B. Accordingly, by executing the computer program instructions, the processor 401 executes an algorithm defined by the method steps of FIGS. 3A-3B. Computer 400 also includes one or more network interfaces 404 for communicating with other devices via a network. Computer 400 also includes one or more input/output devices 405 that enable user interaction with computer 400 (e.g., display, keyboard, mouse, speakers, buttons, etc.).

Processor 401 may include both general and special purpose microprocessors, and may be the sole processor or one of multiple processors of computer 400. Processor 401 may include one or more central processing units (CPUs), for example. Processor 401, data storage device 402, and/or memory 403 may include, be supplemented by, or incorporated in, one or more application-specific integrated circuits (ASICs) and/or one or more field programmable gate arrays (FPGAs).

Data storage device 402 and memory 403 each include a tangible non-transitory computer readable storage medium. Data storage device 402, and memory 403, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 405 may include peripherals, such as a printer, scanner, display screen, etc. For example, input/output devices 405 may include a display device such as a cathode ray tube (CRT) or liquid crystal display (LCD) monitor for displaying information to the user, a keyboard, and a pointing device such as a mouse or a trackball by which the user can provide input to computer 400.

Any or all of the systems and apparatus discussed herein, including cloud services manager 102 and cloud node manager 109, and components thereof, including controllers 210, 260, memory 220, memory 270, deployment module 245, and virtual machine management module 265, may be implemented using a computer such as computer 400.

One skilled in the art will recognize that an implementation of an actual computer or computer system may have other structures and may contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of deploying services in a selected network, the method comprising:
   receiving information indicating a location of a disk image of a virtual machine hosted on a first server on a first network, the virtual machine for deploying services on a second network, wherein communication between the first network and the second network is restricted;
   deactivating the virtual machine;
   instructing the first server on the first network to mount the disk image of the virtual machine;
   adding, to a static routing table on a file system of the virtual machine, a static route pointing to the first network;
   instructing the first server to dismount the disk image of the virtual machine; and
   activating the virtual machine to deploy an application on a second server on the second network based on the static route, the application deployed by the virtual machine hosted on the first server on the first network.

2. The method of claim 1, further comprising:
   creating, by a third server prior to the receiving, the virtual machine on the first server on the first network.

3. The method of claim 2, further comprising:
   receiving, by a fourth server, from the third server, information indicating a location of the disk image of the virtual machine hosted on the first server.

4. The method of claim 1, further comprising:
   deploying, by the virtual machine hosted on the first server, at least one-agent on the second server on the second network, the second network being associated with a customer network, the at least one agent for downloading and installing a software application in response to receiving a command from a management server on the first network.

5. The method of claim 4, wherein:
   the virtual machine hosted on the first server is linked to the first network associated with a first security zone; and
   the second network is associated with a second security zone different from the first security zone.

6. The method of claim 4, wherein the at least one agent is further for monitoring disk usage of the second server on the second network and reporting the monitoring of disk usage to the management server on the first network.

7. The method of claim 6, wherein the at least one agent is further for monitoring central processing unit (CPU) utilization of the second server on the second network and reporting the monitoring CPU utilization to the management server on the first network.

8. The method of claim 1, wherein the application comprises a web server.

9. A non-transitory computer readable medium having program instructions stored thereon, that, in response to execution by a processor, cause the processor to perform operations comprising:
   receiving information indicating a location of a disk image of a virtual machine hosted on a first server on a first network, the virtual machine for deploying services on a second network, wherein communication between the first network and the second network is restricted;
   deactivating the virtual machine;
   instructing the first server on the first network to mount the disk image of the virtual machine;
   adding, to a static routing table on a file system of the virtual machine, a static route pointing to the first network;
   instructing the first server to dismount the disk image of the virtual machine; and
   activating the virtual machine to deploy an application on a second server on the second network based on the static route, the application deployed by the virtual machine hosted on the first server on the first network.

10. The non-transitory computer readable medium of claim 9, the operations further comprising:
    creating, prior to the receiving, the virtual machine on the first server on the first network.

11. The non-transitory computer readable medium of claim 9, the operations further comprising:
    causing the virtual machine hosted on the first server to deploy at least one agent on second server on the second network, the second network being associated with a customer network, the at least one agent for downloading and installing a software application in response to receiving a command from a management server on the first network.

12. The non-transitory computer readable medium of claim 11, wherein the at least one agent is further for:
    monitoring disk usage of the second server on the second network and reporting the monitoring of disk usage to the management server on the first network; and
    monitoring central processing unit (CPU) utilization of the second server on the second network and reporting the monitoring CPU utilization to the management server on the first network.

13. The non-transitory computer readable medium of claim 12, wherein:
the virtual machine hosted on the first server is linked to a first network associated with a first security zone; and
the customer network is associated with a second security zone different from the first security zone.

14. The non-transitory computer readable medium of claim 9, wherein the application comprises a web server.

15. An apparatus comprising:
a memory storing computer program instructions; and
a processor communicatively coupled to the memory, the processor configured to execute the computer program instructions which, when executed on the processor, cause the processor to perform operations comprising:
receiving information indicating a location of a disk image of a virtual machine hosted on a first server on a first network, the virtual machine for deploying services on a second network, wherein communication between the first network and the second network is restricted;
deactivating the virtual machine;
instructing the first server on the first network to mount the disk image of the virtual machine;
adding, to a static routing table on a file system of the virtual machine, a static route pointing to the first network;
instructing the first server to dismount the disk image of the virtual machine; and
activating the virtual machine to deploy an application on a second server on the second network based on the static route, the application deployed by the virtual machine hosted on the first server on the first network.

16. The apparatus of claim 15, wherein the virtual machine hosted on the first server is configured to deploy at least one agent on the second server on the second network, the second network being associated with a customer network, the at least one agent for downloading and installing a software application in response to receiving a command from a management server on the first network.

17. The apparatus of claim 16, wherein the at least one agent is further for:
monitoring disk usage of the second server on the second network and reporting the monitoring of disk usage to the management server on the first network; and
monitoring central processing unit (CPU) utilization of the second server on the second network and reporting the monitoring CPU utilization to the management server on the first network.

18. The apparatus of claim 16, wherein:
the virtual machine hosted on the first server is linked to a first network associated with a first security zone; and
the customer network is associated with a second security zone different from the first security zone.

19. The apparatus of claim 15, wherein the application comprises a web server.

* * * * *